Dec. 2, 1924.
G. H. McLARREN
1,518,086
ILLUMINATED INDICATOR
Filed April 11, 1924
2 Sheets-Sheet 2
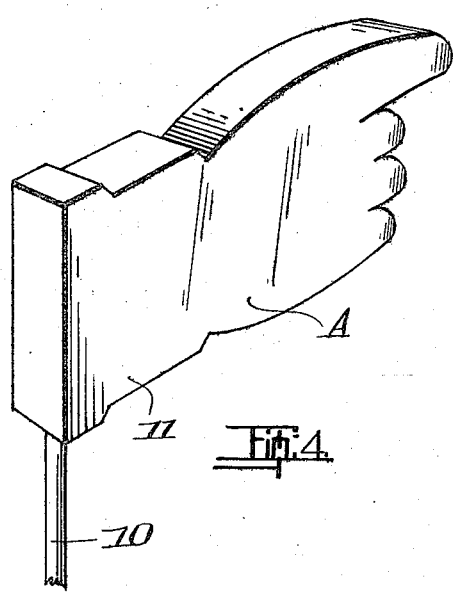
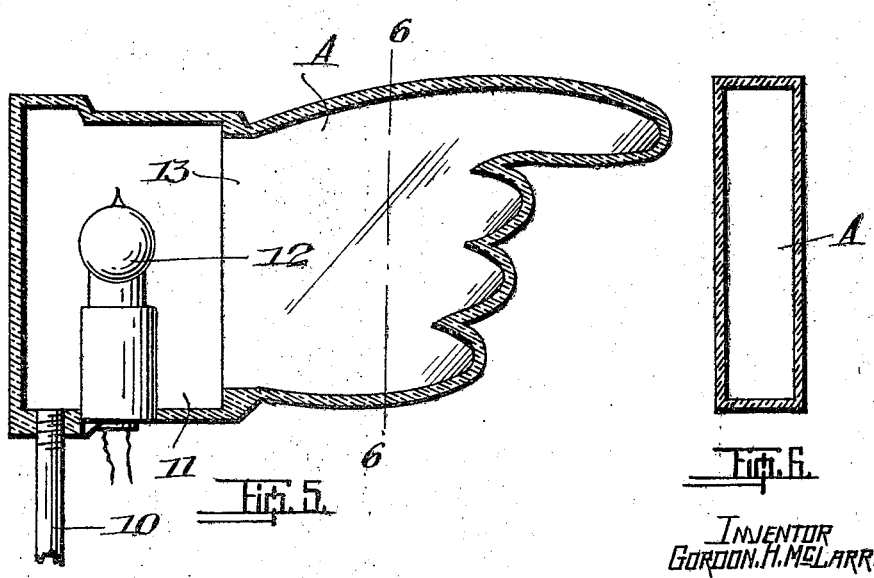
INVENTOR
GORDON. H. MCLARREN.
By
ATTYS.

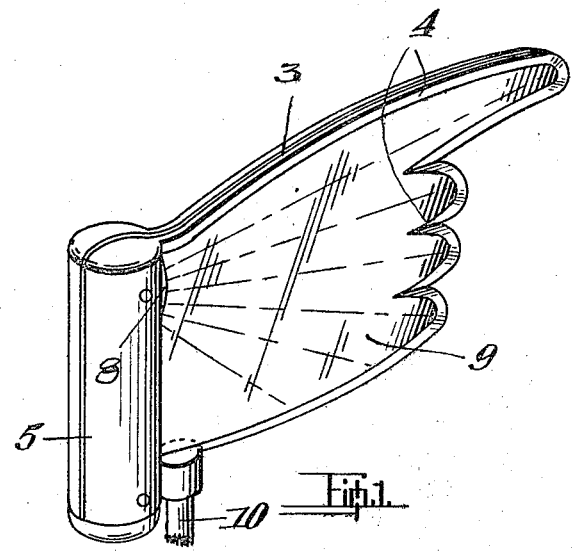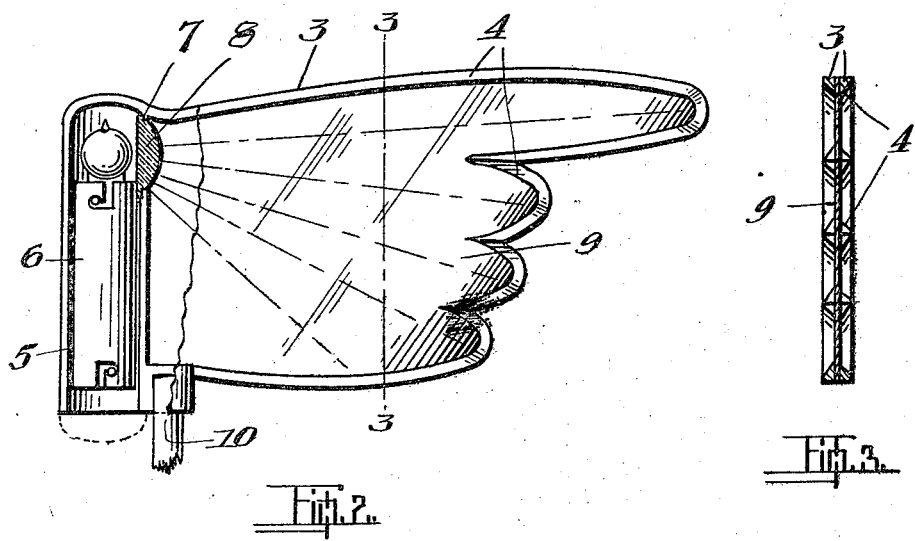

Patented Dec. 2, 1924.

1,518,086

UNITED STATES PATENT OFFICE.

GORDON HILL McLARREN, OF HALIFAX, NOVA SCOTIA, CANADA.

ILLUMINATED INDICATOR.

Application filed April 11, 1924. Serial No. 705,881.

*To all whom it may concern:*

Be it known that I, GORDON HILL MC-LARREN, a subject of the King of Great Britain, and resident of the city of Halifax, in the Province of Nova Scotia and Dominion of Canada, have invented certain new and useful Improvements in Illuminated Indicators, of which the following is a specification.

This invention relates to improvements in illuminated indicators, and more particularly to direction indicators in the form of a hand in combination with illuminating means therein for automobiles and the like.

The novel form of hand hereinafter more fully described and illustrated, and forming the subject matter of this application, is particularly identified with my improvements in automobile signals and for which I have a co-opending application for patent in the United States, filed Dec. 12th, 1923, under Serial No. 680,254.

The objects of the invention are to provide a direction indicator in the form of a hollow hand or the outline of a hand in pointing position and formed of transparent or non-transparent material and designed to carry in the wrist portion a lens whereby the hand indicator as a whole is illuminated and made clearly visible at night, the outline of the hand being provided to reflect the rays of light from said lamp.

Figure 1 is a perspective view of the indicator hand as a whole.

Figure 2 is a side view partly in section.

Figure 3 is a section on line 3—3 of Figure 2.

Figure 4 is a perspective view of a modified form of indicator hand.

Figure 5 is a longitudinal section.

Figure 6 is a vertical section on line 6—6 of Figure 5.

In the drawings, A designates the indicator as a whole conforming to the outline of the human hand in a pointing position and adapted to be mounted on each side of an automobile and rotatably supported in a suitable shaft or standard 10 operatively connected to suitable improved signalling means preferably operable from the driver's seat. It can be constructed of any suitable material and is here shown, in Figures 1, 2 and 3, of light metal, the inside edge 3 all around of the skeleton or human hand being bevelled at 4.

Formed integral with the hand is a hollow or bored wrist portion 5 designed to receive an electric lamp 6 therein, the top of the wrist portion being provided with an opening 7 in which is fitted a suitable lens 8 so that when the lamp is lit the rays of light are directed through the lens to the inside bevelled edges 4, so that at night the interior of the hand may be illuminated.

The outline of the hand may also, though not necessarily, be provided with a filler or panel 9 of transparent or non-transparent material. The filler, however, is not essential as the signal at night is made by the bevelled edges 4 catching the light through the opening in the wrist portion and illuminating the outline of the hand.

In the construction shown in the modified form of my device, as illustrated in Figures 4, 5 and 6, the hand, instead of being in outline only, is made of a hollow casing in which the sides can be of suitable transparent or non-transparent material. Otherwise the construction of the indicator is similar to that disclosed in Figures 1, 2 and 3, 11 being the bored wrist portion adapted to receive a lamp therein 12, while between the bored wrist and the hand proper is an opening 13 through which the light from the lamp 12 radiates, illuminating the form of the pointing hand.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

An indicator for automobiles comprising a marginal frame conforming in outline to the human hand and having the inside edges bevelled to form a reflector, a stem formed integral with the frame, a vertically extending bore in said stem designed to hold a lamp, an opening in said stem between the bore and the frame adapted to hold a lens whereby the rays of the lamp carried by the stem are directed to the reflector edges of the frame.

In witness whereof I have hereunto set my hand in the presence of two witnesses.

GORDON HILL McLARREN.

Witnesses:
N. C. RALSTON,
E. W. W. SIML.